US005532050A

United States Patent [19]
Brooks

[11] Patent Number: 5,532,050
[45] Date of Patent: Jul. 2, 1996

[54] DENSIFIED THERMO-BONDED SYNTHETIC FIBER BATTING

[75] Inventor: Troy L. Brooks, Gastonia, N.C.

[73] Assignee: Wm. T. Burnett & Co., Inc., Baltimore, Md.

[21] Appl. No.: 880,276

[22] Filed: Jun. 30, 1986

[51] Int. Cl.⁶ .................................................. D04H 1/08
[52] U.S. Cl. ........................ 428/220; 156/62.6; 156/296; 156/308.2; 156/555; 264/119; 428/221; 428/224; 428/280; 428/288; 428/296
[58] Field of Search .................................. 428/220, 221, 428/224, 280, 288, 296; 156/296, 62.6, 308.2, 555; 264/119

[56] References Cited

U.S. PATENT DOCUMENTS 3,616,031 10/1971 Fleissner ............................... 428/280
4,068,036 1/1978 Stanistreet ............................. 428/296
4,520,066 5/1985 Athey ................................... 428/296
4,542,060 9/1985 Yoshida et al. ....................... 428/296
4,601,937 7/1986 Latussek .............................. 428/288

Primary Examiner—James J. Bell
Attorney, Agent, or Firm—Breiner & Breiner

[57] ABSTRACT

A densified batt comprising a mixture of low melting and high melting synthetic fibers or high melting synthetic fibers coated with a low melting material formed by building up the fibers into a batt of unbonded fibers of substantial height, compressing the unbonded fibers to the extent that the batt has a height of at most one-third the height when not compressed, heating the compressed batt to bond the fibers together, and cooling the heated compressed batt while still compressed to provide the densified batt. The batting being in a single layer and uniform throughout can be readily fabricated into cushioning or the like having controlled characteristics.

15 Claims, 2 Drawing Sheets

DENSIFIED THERMO-BONDED SYNTHETIC FIBER BATTING

FIELD OF INVENTION

This invention relates to the production of non-woven fibrous batting. More particularly, the invention relates to the production of thermo-bonded, densified, non-woven fibrous synthetic batting comprising a mixture of low melting and high melting synthetic fibers or high melting synthetic fibers coated with a low melting material. The thermo-bonded densified batting can be readily used in the fabrication of cushions, mattresses, pads, and the like with reduced labor costs to provide improved products.

BACKGROUND AND PRIOR ART

In the manufacture of batting, natural or synthetic fibers making up the batting are fed through a series of carding or garnetting units which comb the fibers before depositing the fibers onto a traveling belt where the fibers are accumulated and matted together to form a thick web which is transported to another location for use in the manufacture of cushions, upholstery, pillows, mattresses, pads, and the like. The fabrication of the batting into the various products have presented individual problems, with a number of the processes involved being very labor intensive.

One particular labor intensive process has been the fabrication of cushions for chair or sofa seats and backs, or the like. These cushions must be very firm so as not to bottom-out when compressed, but yet they must have a uniform cushioning feel throughout. In order to obtain the necessary firmness and uniform cushioning feel it has been customary in the trade to take many layers of unbonded batting or one very thick layer of unbonded batting, and stuff the batting into a cushion casing. The process is primarily a hand operation, with resultant high labor costs. Moreover, even with the care possible in a hand operation, the uniformity of the cushion is determined by the individual capability and care of a particular operator, leading to quality control problems.

Heretofore it has been recognized that synthetic fibrous battings can be compressed. Thus, U.S. Pat. Nos. 2,893,105; 2,908,064, and 2,910,763 disclose non-woven filamentary products or the like wherein after the fibers and filaments are carded or garnetted they are needle-punched to densify the batt, and thereafter the batt is subjected to pressing rolls. The process, utilizing select components, is substantially time-consuming and results in a thin compressed web having specific applications. U.S. Pat. Nos. 3,364,543 and 3,407,461 provide compressed battings based on needle-punching and mechanical compression. U.S. Pat. No. 3,936,555 discloses a product having a density gradient from surface to surface. These products are manufactured by needling a batt, impregnating the batt with a liquid-phase filler, and thereafter bonding a plurality of the batts together. U.S. Pat. No. 4,284,680 discloses a multi-layered needle-punched, felt-like cushioning material. The cushioning material is made up of at least two fibrous batts and at least one foundation fabric interposed between the batts and needle-punched with the batts. U.S. Pat. No. 4,129,675 discloses a batt made of a blend of hollow polyester fibers. The blend is subjected to contact heating such as by passing the batt through a compression zone formed between a heated roller and a conveyor belt, with the heating roll heating and compressing the batt to generally no more than about 50% of its original thickness. It is stated that hollow polyester fibers provide unexpectedly high filling power in a batt as compared to using solid fibers. It is recognized that the heat and compression treatment, depending on the degree of compression, will provide a batt with a scrim or skin at the surface of the batt. It is also stated that the scrim or skin is of a greater opacity and a lesser porosity when using hollow polyester fibers than is obtained from the same treatment except where solid fibers are utilized.

The compressed synthetic battings of the prior art have only a limited thickness. Although it is proposed that these batts can be layered, such layering also causes problems and is not totally satisfactory. Further, the compressed batts conventionally are not thermo-bonded. It was believed that difficulties would be encountered in making thick, thermo-bonded densified batts due to localized heating at the surfaces of the batt, thus providing a batt which has a greater density or skin at the surfaces, precluding uniform characteristics and feel throughout the batt, as noted in U.S. Pat. No. 4,129,675.

Moreover, heretofore when a compressed batting being of small thickness regardless of how made is stuffed into a cushion casing, distinct areas of non-uniformity in the cushioning are realized as a result of air spaces adjacent to the different layers or foldings of the thin densified batting. This provides a product having a degree of non-uniformity. Moreover, when the densified batting is stacked as layers and put into a cushion casing, similar non-uniformity in feel characteristics are observed due to the spacing between the various layers.

Accordingly, there has been a distinct need for a densified batting having a uniformity throughout and in a thickness sufficient to permit a single layer of the batting to be utilized in a cushioning or the like product.

PRIMARY OBJECTS AND GENERAL DESCRIPTION OF INVENTION

It is a primary object of the present invention to provide a densified thermo-bonded batting comprising a mixture of low melt and high melt synthetic fibers, or high melting synthetic fibers coated with a low melting material, which has a stable and uniform thickness sufficient to permit the use of the batting as a single layer in a cushioning product.

It is another object of the present invention to provide a densified thermo-bonded synthetic batting comprising a mixture of low melting and high melting synthetic fibers, or high melting synthetic fibers coated with a low melting material, wherein the densified batting has a density greater than about one and one-half ounces per board foot, a thickness greater than about one inch, and a weight of at least two and one-fourth ounces per square foot.

It is still another object of the present invention to provide a process of producing densified thermo-bonded batting comprising mixing low melting and high melting synthetic fibers, or high melting synthetic fibers coated with a low melting material, compressing, and heating and cooling while compressed to provide a thick, compressed thermo-bonded product having uniformity throughout.

The above primary and other objects of the present invention are realized by providing a mixture of low melting and high melting synthetic staple fibers, or high melting synthetic staple fibers coated with a low melting material; arranging the fibers so as to build-up the fibers into a batt or felt of substantial height; compressing the built-up batt or felt to an extent that the batt or felt has a height of at most about one-third the height when not compressed; heating the batt while compressed by passing a hot fluid such as hot air or steam through the batt to thermo-bond the fibers together; and thereafter cooling the heated and compressed batt while still compressed to provide the densified batting. It is surprising that the batting obtained, although in the highly compressed state when subjected to heat treatment to effect thermo-bonding, does not have a greater densification at its surfaces or have a surface skin.

It is believed that the uniformity of density obtained stems from the continuous passage of fluid through the compressed batt to thermo-bond, and then cooling the batt while still compressed. In any event, the batt, even though compressed to from about 33% or less of its original thickness, remains in its compressed state after the compression is removed without densification at its surface.

The synthetic staple fibers useful in the densified batting according to this invention are preferably made up of synthetic polyester continuous filaments chopped into staple fibers. The staple fibers can, however, be derived from various other polymers including polymers of an organic acid ester of cellulose such as cellulose acetate, cellulose propionate, cellulose butyrate, cellulose acetate propionate, cellulose acetate butyrate, or the like. Additionally, the filamentary material used to make the staple fibers can be composed of rayon, nylon, polyethylene terephthalates, polyolefins such as polypropylene and polyethylene, polymers of halo-olefins such as vinyl chloride or vinylidene chloride as well as copolymers of polyesters such as copolymers of poly(ethylene terephthalate) with diethylene glycol, and the like. The particular polymeric material utilized includes all filaments useful in preparing high-loft synthetic battings. These continuous filaments are fabricated as nonwoven continuous filament webs as is known in the art.

Thus, one method of initial web formation involves extruding a thermoplastic polymer through a multiple number of downwardly directed spinning nozzles, preferably extending in a row or a multiple number of rows. The filaments, as they are spun, are then gathered into a straight row of side-by-side, evenly spaced apart, untwisted bundles, each containing at least about 15 and preferably from 50 up to 1,000 filaments. These filament bundles are simultaneously drawn downwardly at a high velocity in individual surroundings as columns flowing at supersonic velocity and directed to impinge on a substantially horizontal carrier. The gathering of the filaments into the untwisted bundles and their drawing and directing to impinge on the carrier is preferably effected by passing the bundles to air guns which surround the filaments with a column or jet of air which is directed downwardly at supersonic velocity. The air guns are arranged so as to extend in one or more rows extending across the carrier at right angles to its direction of movement, so that the bundles confined in the gas columns as the same strike the moving carrier extend in a line or row at right angles across the carrier. Other conventional methods known in the art can be utilized. These filaments are chopped to provide staple fibers.

In one preferred embodiment of the present invention, one component of the mixture of staple fibers will have a softening temperature significantly lower than the softening temperature of the other component. It has been found that the low melting fibers should melt at least about 50° F. below the melting temperature of the high melting fibers. It has also been found that in providing a preferred densified thermo-bonded batting the melting point of the high molecular weight polymer which will comprise from about 60% to 90% of the entire quantity of fibers will have a melting temperature in the range of from about 350° F. to 500° F. The low melting fibers which will comprise the balance of the entire fiber amount, i.e., from about 10% to 40%, will have a melting temperature in the range of about 160° F. to 300° F., the controlling feature being that the difference between the high melting and low melting material is at least approximately 50° F. The component having the lower softening temperature will melt under the conditions of processing in order to bond the higher melting components together. Alternatively, rather than using a plurality of components having different melting temperatures, it may be desirable to utilize fibers having a core of high melting material and a coating or sheath of low melting material whereby the low melting material will melt, again providing the necessary bonding. In the thermo-bonding process, the temperature should not be increased to the extent that the crimp characteristics of the high melting fiber are altered.

It is essential in providing the densified thermo-bonded batting that the bonding process be carried out to avoid fusing of the fibers into a solid mass, including at the surfaces of the batt. Thus, one method of effecting bonding is by compressing the unbonded web of fibers, and passing the compressed unbonded batt of fibers through an oven, especially an oven through which the batt travels on a continuous perforated belt and hot fluid, for example steam or air, is blown downward or upward through the batt. The fluid will be at a temperature sufficient to heat the batt to a temperature in excess of the softening temperature of the lower softening component but below the softening temperature of the high melting component to effect bonding. While still being compressed, the batt will then be cooled again by passing a fluid such as air but at a low temperature through the batt to quench the fibers so that they rapidly re-develop their modulus, and any tendency for the batt to solidify at the surfaces thereof will be avoided.

The characteristics of the densified thermo-bonded batt can be controlled according to the characteristics of the synthetic fibers utilized. Fibers, as the term is utilized in the present application, refer to staple, first-grade fibers, i.e., unused fibers, having a length of from about 0.5 inch to about twelve inches, and preferably from about two to four inches. The length of the fibers will to some extent control the characteristics of the ultimate batt. Of greater importance in determining the characteristics of batt, however, is the diameter or denier of the fiber, it being recognized that large fibers normally impart a greater roughness, body, stiffness, or crispness to the batt. Large fibers also have a greater resistance to crushing characteristics. Finer fibers, on the other hand, will provide a substantially softer and pliable character to the batt. The diameter of manmade fibers is controlled by the size of spinneret holes and by stretching and drawing during and after spinning of the fibers and, accordingly, can be carefully controlled. Fiber size is conventionally measured in denier. Denier is determined by weighing 9,000 meters of fiber. Denier is the weight in grams of this unit length. While the denier can vary substantially without having an adverse influence on the densified thermo-bonded batt of the present invention, the denier is to be in the range of from about 4.5 to 40. If the diameter of the fibers is measured, the diameter for solid fibers preferably is in the range of from about 10–250 microns, more preferably about 30–80 microns; and will have a density in the range of from about 0.91–1.75. In the event hollow fibers are utilized, the diameter can be increased up to 400 microns and greater, and preferably from about 30 to 200 microns. The surface contours and cross-sectional shape of the fibers can also be controlled in the synthetic filaments and, thus, the fibers chopped from the filaments. The cross-sectional shape is important in developing bulk, body, and texture as well as hand or feel to the batt. Surface contour which is defined as the surface of the fiber along its shaft can also contribute to the same characteristics. The crimp of the fibers which refers to waves, joints, twists, coils, or curling along the length of the fiber will increase the cohesivity, resiliency, resistance to abrasion, and bulk of the resultant batt made from the fibers. It is important in forming the densified thermo-bonded batting that the fibers are crimped at least to some extent. Additionally, the chemical composition of the fibers will serve to contribute to the ultimate characteristics of the fibers and to the batt made from the fibers, including as a result of their stiffness, hydrophilic, or hydrophobic character. These characteristics can be important depending upon the ultimate use of the densified batt made in accordance with this invention. By controlling the characteristics of the fibers utilized, it is possible to obtain a batt having various specific properties to meet a particular application. For example, a water-resistant cushion can be made from a densified polyester batt, which makes it possible to use less expensive covering fabrics where heretofore it was necessary to use costly fabrics in order to obtain the necessary water resistance.

BRIEF DESCRIPTION OF DRAWINGS

The preferred embodiments of the present invention will be defined in reference to the drawings. In the drawings.

DETAILED DESCRIPTION OF PREFERRED EMBODIMENTS

Figure 1:
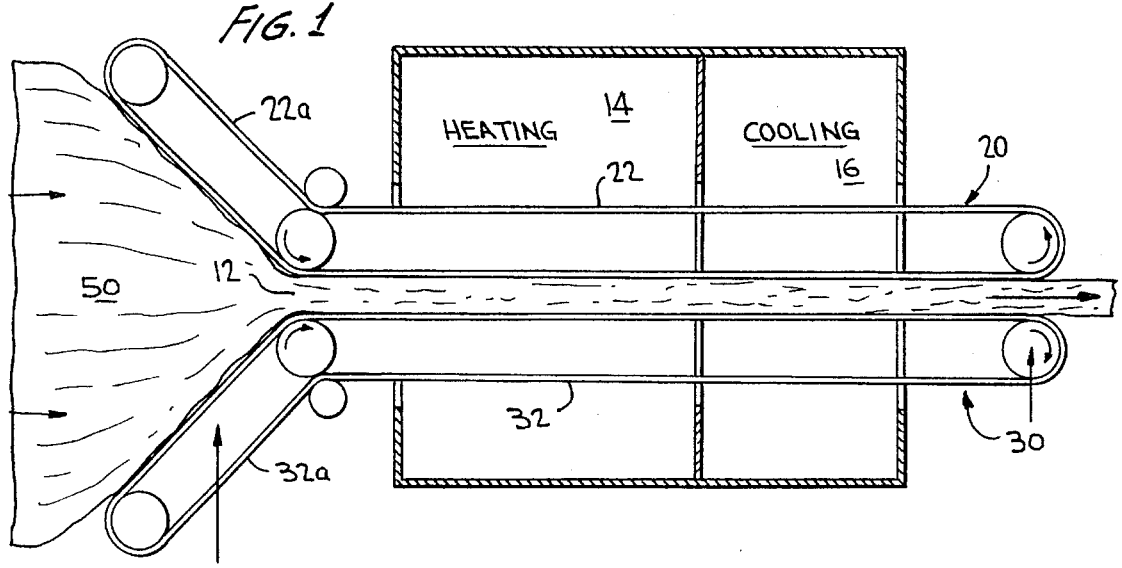
FIG. 1 is a schematic illustration of a conveyor system useful in making the densified batting of the present invention. According to FIG. 1, two continuously moving conveyor belts which apply pressure to the batt extend through a housing having a heating zone and a cooling zone.

FIG. 1 is a schematic representation of a preferred process and apparatus for making the densified thermo-bonded synthetic fiber batting of the present invention. In FIG. 1 a web 50 approximately 50 inches in height of unbonded synthetic fibers is fed to a continuously moving conveyor system 10 comprising top conveyor 20 and bottom conveyor 30. The web comprises a mixture of low melting fibers, i.e., a copolymer of polyesters commercially available which have a melting point of 280° F.; and a high melting fiber, i.e., commercially available staple polyester fibers which have a melting point of about 480° F., which has been previously passed through a series of carding units. The carded web 50 as it is moved toward nip 12 of conveyor system 10 is compressed by moving belts 22 and 32. These belts are perforated (not shown) to allow for the passage therethrough of a hot or cold fluid at the time the belts are moving through heating and cooling chambers 14 and 16. The space between belts 22 and 32 at the nip 12 is 6 inches.

As the compressed web enters heating chamber 14, hot air at a temperature of about 300° F. is pulled downward through the batt to melt the low melting component. The web 50, after passing through heating chamber 14, enters cooling chamber 16 where cold air at a temperature at about 60° F. is pulled through the web cooling the web and causing the low melting component to solidify and bond the fibrous web together. The cooled web 50 as it passes from the conveyor is of uniform thickness throughout. There is no skin or densification at the surfaces of the batt. The batt is ready for transport to a location for fabrication into cushions or the like.

Figure 2:
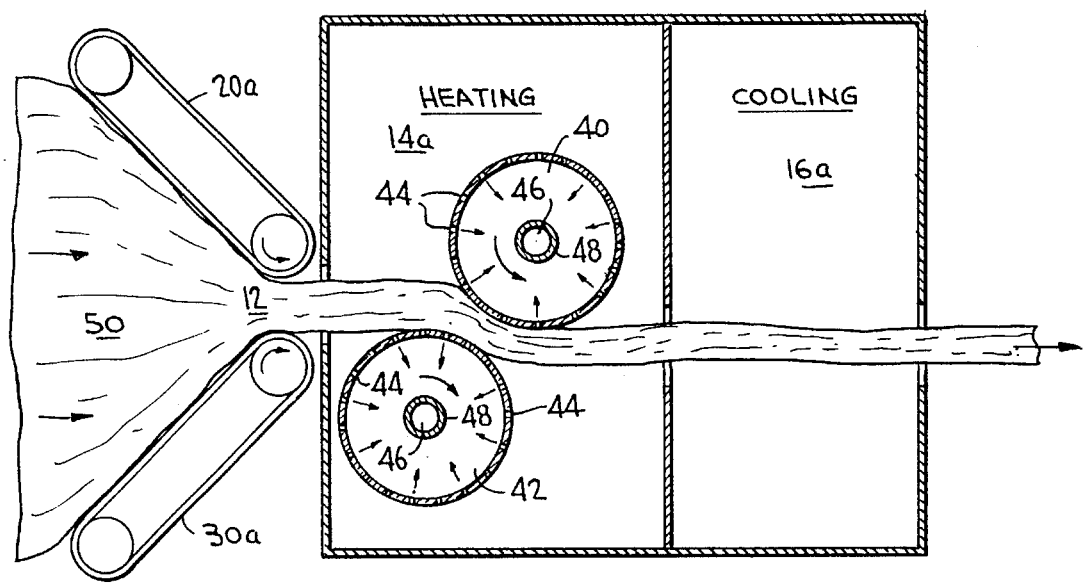
FIG. 2 is a similarly designed unit to that of FIG. 1, but employs dual vacuum drums for controlling the compression and movement of the batting through the oven.

The apparatus and process illustrated in FIG. 2 is substantially similar to that illustrated in FIG. 1. However, in FIG. 2 the moving belt conveyors 20a and 30a end at nip 12a, and thereafter the web 50 compressed to the thickness of the nip is controlled by offset drums 40 and 42 in heating chamber 14a. Each of the offset drums are perforated as shown and a vacuum is drawn on the drums through the perforations 44 as illustrated by the arrows, with the vacuum being removed through spaced-apart annular walls 46 and 48. As the web leaves the control of drum 40, it passes into cooling chamber 16a carried by its own strength but still compressed, and is removed from the cooling chamber 16a for transport to a location for fabrication. This apparatus and process does not provide the same degree of control as the apparatus and process of FIG. 1.

Figure 3:
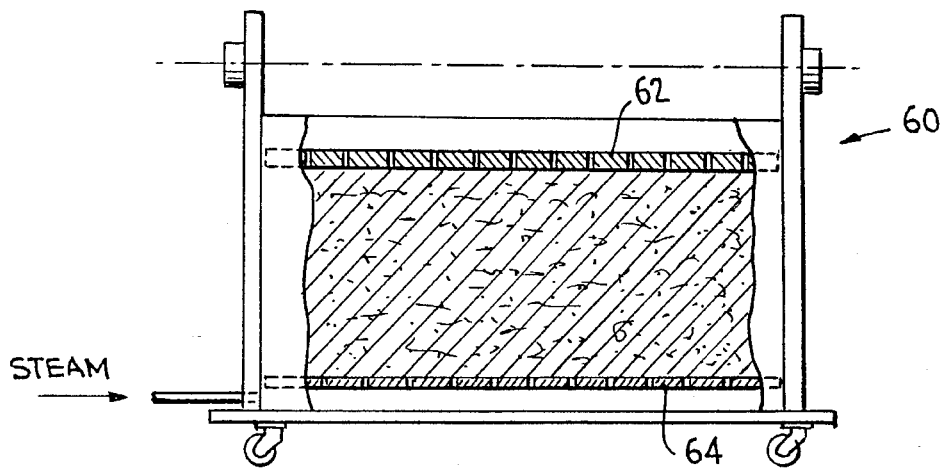
FIGS. 3 and 4 illustrate a mold which can be used in the batch formation of batting wherein the heating of the batting is accomplished using steam and wherein the cooling can be accomplished by substituting cool air for the steam.
Figure 4:
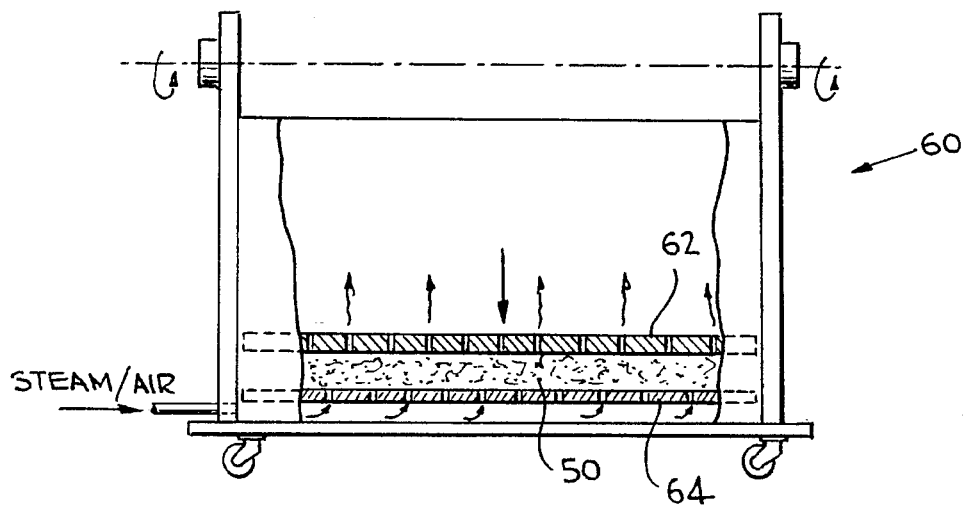
Figure 5:
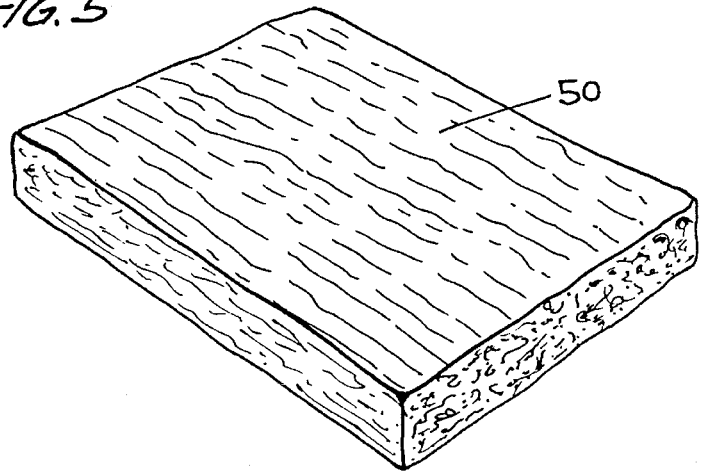
FIG. 5 is a schematic view of batting made in accordance with the process of FIGS. 3 and 4.

The system shown in FIGS. 3 and 4 is a schematic of still another apparatus and process of making the densified web of the present invention. The process illustrated in FIGS. 3 and 4 is a batch process. In this process web 50 is inserted into a mold 60, compressed to the desired thickness by lowering perforated compressing plate 62, i.e., 6 inches. Steam is fed into the mold through perforated base plate 64 and then passed through the web 50 while being compressed to heat the web to a temperature of approximately 230° F. where the lower melting component of the mixture is melted, due to the increased pressure and effect of moisture on the fibers. After being retained in the mold for approximately six minutes with flipping of the mold if desired, the steaming is discontinued and the steam replaced with cold air to cool the web. The compressed web 50 removed from the mold is shown in FIG. 5.

In addition to controlling the batt by the judicious selection of fibers as considered hereinbefore, the characteristics of the batt can be controlled by the extent of compression of the unbonded fibrous web prior to heating. Thus, in the preferred process illustrated in FIG. 1, the leading edge of conveyor 20, i.e., the section formed by belt sections 22a and 32a, can be extended and angled according to the thickness or the height of the unbonded fibrous web. The space at the nip 12 can also be controlled in order to provide varying thicknesses in the final web. It has been found, however, that the batting made according to the present invention will have a density greater than about one and one-half ounces per board foot and a thickness greater than about one inch. The weight will be at least about two and one-quarter ounces per square foot. Preferably the unbonded batting will have an original height of from about seven inches to about 60 inches or more, with the ultimate batt having a thickness of from about 1.5 inches to 10 inches. The unbonded web will be compressed so that its height is only about one-third or less the height of the thickness of the unbonded web, and preferably to no more than about one-fifth of the height of the unbonded web. "Original height" as used herein is the height of unbonded batt made on a cross-lapper without using compression to remove air between or within lapped layers. These products have the density and resilient characteristics essential in fabricating cushions, mattresses, pads, and the like.

As will be apparent to one skilled in the art, various modifications can be made within the scope of the aforesaid description. Such modifications being within the ability of one skilled in the art form a part of the present invention and are embraced by the appended claims.

It is claimed:

1. A stable, densified batting having substantial uniformity in thickness and controlled density throughout comprised of thermobonded, crimped, staple, manmade synthetic fibers having a denier of 4.5 to 40, a density greater than about 1.5 ounces per board foot, and a thickness greater than about 2.33 inches; said densified batting being a product made by providing a mixture of low-melting and high-melting crimped synthetic fibers, or high-melting crimped synthetic fibers coated with a low-melting material, said high-melting crimped synthetic fibers having a melting point at least 50° F. higher than the low-melting component; arranging said fibers as a batt, and compressing the batt to the extent that the batt has a height of at most one-third the height before compression and the batt has a density of at least about 1.5 ounces per board foot, and a thickness greater than about 2.33 inches; heating the batt by passing a hot fluid through the batt at a temperature above the melting point of said low-melting component, with said heating being below a temperature at which the crimp characteristics of the high-melting fibers are altered; and cooling the compressed batt below the melting point of said low-melting component to bond said high-melting fibers, with said cooling being such that the batt maintains its resiliency and with the batt bonding to provide a stable, densified batting.

2. The batting of claim 1 wherein said synthetic fibers are polyester fibers.

3. The batting of claim 2 wherein the denier is in the range of from 5.5 to 25.

4. The batting of claim 3 wherein the thickness is between 2.33 and about 10 inches.

5. The batting of claim 3 wherein the mixture of fibers is from about 60% to 90% high-melting fiber and from about 40% to 10% low-melting fibers.

6. A densified batt comprising a mixture of low melting and high melting synthetic fibers or high melting synthetic fibers coated with a low melting material formed by building up the fibers into a batt of unbonded fibers of substantial height, compressing the unbonded fibers to the extent that the batt has a height of at most one-third the height when not compressed, heating the compressed batt to bond the fibers together, and cooling the heated compressed batt while still compressed to provide the densified batt.

7. A process of making a densified batting comprising providing a mixture of low melting and high melting synthetic fibers; arranging said mixture of fibers as a batt built-up to a height greater than about 7 inches; compressing the batt to an extent that the batt has a height of at most one-third the height when not compressed; heating said compressed batt to bond the fibers together, and cooling the heated compressed batt while still compressed to provide a densified batt.

8. The process of claim 7 wherein the mixture of fibers is from about 60% to 90% high melting fibers and from about 40% to 10% low melting fibers.

9. The process of claim 8 wherein the unbonded fibers are built-up to a height of about 9 to 50 inches and the batt is compressed to a height of at most about one-fifth the height when not compressed.

10. A densified batt made according to the process of claim 8.

11. A densified batt made according to the process of claim 9.

12. A process of making a densified batt comprising high melting synthetic fibers coated with a low melting material, arranging said fibers as a batt built-up to a height greater than about 7 inches; compressing the batt to an extent that the batt has a height of at most one-third the height when not compressed; heating said compressed batt to bond the fibers together, and cooling the heated compressed batt while still compressed to provide a densified batt.

13. The process of claim 12 wherein the unbonded fibers are built-up to a height of about 9 to 50 inches and the batt is compressed to a height of at most about one-fifth the height when not compressed.

14. A densified batt made according to the process of claim 12.

15. A densified batt made according to the process of claim 13.

* * * * *